United States Patent
Karjanlahti

(10) Patent No.: US 7,299,272 B2
(45) Date of Patent: Nov. 20, 2007

(54) METHOD FOR ACTIVATING PACKET DATA PROTOCOL CONTEXT FOR ROAMING SUBSCRIBER, NETWORK EQUIPMENT AND TELECOMMUNICATION SYSTEM FOR UTILIZING SAME

(75) Inventor: Juha Karjanlahti, Espoo (FI)

(73) Assignee: Eads Secure Networks Oy, Helsinki (FI)

( * ) Notice: Subject to any disclaimer, the term of this patent is extended or adjusted under 35 U.S.C. 154(b) by 942 days.

(21) Appl. No.: 10/126,952

(22) Filed: Apr. 22, 2002

(65) Prior Publication Data
US 2003/0208628 A1 Nov. 6, 2003

Related U.S. Application Data

(63) Continuation of application No. PCT/Fi00/00911, filed on Oct. 19, 2000.

(30) Foreign Application Priority Data
Oct. 22, 1999 (FI) ................................. 19992299

(51) Int. Cl.
*G06F 13/00* (2006.01)
(52) U.S. Cl. .................................... 709/220
(58) Field of Classification Search ...................... None
See application file for complete search history.

(56) References Cited

U.S. PATENT DOCUMENTS 6,104,929 A * 8/2000 Josse et al. ................. 455/445
6,466,964 B1 * 10/2002 Leung et al. ................ 709/202
6,469,998 B1 * 10/2002 Burgaleta Salinas et al. ............................. 370/338
6,608,832 B2 * 8/2003 Forslow ...................... 370/353
6,636,502 B1 * 10/2003 Lager et al. ................. 370/352

FOREIGN PATENT DOCUMENTS

| WO | WO98/32305 | 7/1998 |
| WO | WO98/43446 | 10/1998 |
| WO | WO98/59505 | 10/1998 |
| WO | WO99/05828 | 4/1999 |
| WO | WO99/16266 | 4/1999 |

(Continued)

OTHER PUBLICATIONS

"TETRA Packet Data Protocol," ETS 300 392-2 Clause, Version ME 04, Aug. 2, 1999, 76 pp.

(Continued)

*Primary Examiner*—Robert B. Harrell
(74) *Attorney, Agent, or Firm*—Barnes & Thornburg LLP

(57) ABSTRACT

A method of activating a packet data protocol context for a roaming terminal in a telecommunication system including a home network, a gateway support node to external packet networks, the node being used in the home network, at least one terminal and a visited network. When the terminal requests for packet data protocol context activation in the visited network, the visited network defines the gateway support node address on the basis of the network identifier and a subscriber identifier transmitted by the terminal. On the basis of the defined address, a request for packet data protocol context activation is transmitted from the visited network to the gateway support node and the activation of the packet data protocol context is finished.

16 Claims, 2 Drawing Sheets

FOREIGN PATENT DOCUMENTS

WO    WO99/37103    7/1999
WO    WO99/48310    9/1999

OTHER PUBLICATIONS

"Digital Cellular Telecommunication System (Phase 2+); General Packet Radio Service (GPRS); GPRS Tunneling Protocol (GTP) across the Gn and Gp Interface; (GSM 09/60 version 6.2.0)," Draft TS 100 960 V.6.2.0 (Oct. 1988), 65pp.

Nokia, Networks, World Intellectual Property Organization WO 01/30030 A1 (pp. Abstract, figurs 1-4, and pp. 1-16).

* cited by examiner

METHOD FOR ACTIVATING PACKET DATA PROTOCOL CONTEXT FOR ROAMING SUBSCRIBER, NETWORK EQUIPMENT AND TELECOMMUNICATION SYSTEM FOR UTILIZING SAME

CROSS REFERENCE TO RELATED APPLICATIONS

This a Continuation application of International Application No. PCT/FI00/00911, which was filed on Oct. 19, 2000, and which designated the U.S. and was published in the English language, which claimed priority to Finnish application no 19992299, filed Oct. 22, 1999.

BACKGROUND OF THE INVENTION

The invention relates to activation of a packet data protocol context when a terminal moves from one packet-switched network to another, there being no signalling interface between the networks to support mobility management.

To meet the communication needs of mobile users various public radio networks, such as a digital mobile communication system GSM (Global System for Mobile Communication), have been developed. Besides public networks with a wide coverage area, various wireless local area networks and private networks have also been developed. PMR-type (Private Mobile Radio or Professional Mobile Radio) private networks, such as TETRA (Terrestrial Trunked Radio), are typically company networks or networks for authorities, wherein all channels are used by one or more companies or authorities.

Because of the expansion of the Internet in particular, networks providing different packet-switched services have been developed in the last few years. The GPRS (General Packet Radio Service) packet radio service has been developed for packet-switched data transmission in the GSM system. The most important network elements of the GPRS are a GPRS gateway support node (GGSN) and a GPRS support node SGSN. The SGSN controls the packet data service in the area of one or more cells in a cellular-type of packet radio network. For this purpose, each support node SGSN is typically connected to a base station subsystem. A terminal in the cell communicates over the radio interface with a base station and further through the base station subsystem with the support node SGSN to whose service area the cell belongs.

The GPRS gateway support node GGSN communicates with external networks, i.e. combines the GPRS service of the operator with other packet networks, such as an IP-based network (e.g. Internet, Intranet) or an X.25 network. The GGSN comprises routing information, i.e. SGSN addresses, of GPRS subscribers and external network addresses relating to packet data protocol contexts (PDP). The GGSN functions as a router between an external address and internal routing information (e.g. SGSN). The GGSN can also transmit packets from one mobile station to another inside the network.

A mobile station attached to the GPRS can receive and/or transmit data packets on the basis of a certain PDP address, provided that the corresponding PDP (Packet Data Protocol) context is activated in the mobile station, the serving support node and the GGSN. When a connection to external networks needs to be established, the gateway support node (GGSN) to be used is selected on the basis of an access point name APN. The connection to the external networks is arranged through the access point, and the GGSN address can be defined on the basis of the access point name APN. The serving GPRS support node SGSN transmits a 'Create PDP Context Request' to the GGSN, which is selected according to the GGSN address stored in the subscriber data or according to the access point name given by the mobile station, or to the default GGSN which is known by the SGSN. The PDP context activation makes the mobile station known to the corresponding GGSN, and the co-operation with the external data networks may begin. A tunnel is thereby formed between the gateway support node GGSN and the support node SGSN serving the mobile station. The tunnel can be formed by utilizing a GPRS tunnelling protocol GTP between the SGSN and the GGSN, the protocol being defined in the GPRS specification GSM 09-60 "GPRS Tunneling Protocol (GTP) across the Gn and Gp Interface", version 6.2.0, October 1998.

When a subscriber moves from one support node to be served by another support node, the PDP context routing information of the GGSN is updated by using the address of the new support node. When the support nodes and the gateway support nodes belong to the same GPRS network (the same PLMN, Public Land Mobile Network), the interface between them is Gn. If the subscriber moves to a new GPRS network (the PLMN is different), the new support node can request the old support node for the PDP context information and it can update the PDP context information in the GGSN via the interface Gp.

The GGSN can be used as a gateway support node to the external networks also for other nodes than the SGSN support node, as is illustrated in FIG. 1. In principle, any packet-switched network NW1, NW2 can establish a connection to the GGSN by using the GTP tunnelling protocol according to the GPRS standard. The GGSN can function as a gateway support node to other packet networks PDN (1) for the home network NW1 of the subscriber using the mobile station MS. A home network refers to a network in which all subscriber data relating to a mobile station MS subscriber and required in the network are maintained permanently, which means that a home location register is to be found in the home network. In such a case, a packet data protocol context is activated between the mobile station MS, the home network NW1 and the GGSN. The interface Gn of the GPRS system can be used between the network NW1 and the GGSN. When the context is activated, data can be transferred between the mobile station and the external packet networks PDN. When the subscriber moves in the network NW1 area, the information on the PDP context changes is transmitted, if required, (if the support node serving the mobile station of the network NW1 changes) to the GGSN.

When the mobile station MS moves to the coverage area (2) of a base station of the visited network NW2, the mobile station MS roams the network NW2. In some cases there is no signalling interface between the different packet radio networks to support the mobility. Between various private networks in particular there is typically no signalling interface that is required, nor do they thus support roaming. If there is no signalling interface and the mobile station MS tries to request for a service in the network NW2 area, the visited network NW2 does not obtain any information relating to the subscriber or the PDP context activated in the network NW1 from the home network NW1.

The problem is in particular that the visited network does not obtain information on the gateway support node GGSN to be used, and the packet data protocol context cannot thus be activated through the visited network to the gateway support node. If the access point name is transmitted from the mobile station, the visited network cannot limit the selection of the access point (and of the gateway support node) in a manner required by the home network.

BRIEF DESCRIPTION OF THE INVENTION

It is thus an object of the invention to provide a method and an apparatus implementing the method such that the above problems can be avoided. The objects of the invention are achieved by a method and a system which are characterized by what is said in the independent claims. The preferred embodiments of the invention are disclosed in the dependent claims.

The underlying idea of the invention is that an access point defined by a certain home network and a gateway support node defined by the access point identity are always used, regardless of the visited network a terminal roams at each time. The invention is based on the idea that when a roaming terminal requests for packet data protocol context activation in the visited network, the visited network defines the gateway support node address on the basis of the subscriber identifier transmitted by the terminal and on the basis of a predetermined network identifier of the access point. Thus, at least the network identifier of the access point is stored for visiting terminals in the visited network. On the basis of the gateway support node address, the visited network can transmit the request for packet data protocol context activation to the gateway support node, and the activation of the packet data protocol context can, if allowed by the gateway support node, be finished.

The method and system of the invention provide the advantage that the visited network is able to define which gateway support node is to be used to the external packet networks and the packet data protocol context can be established. The subscriber can thus roam different networks and receive packet-switched services via the gateway support node of the home network, regardless of the location of the subscriber. The home network maintains the control over subscribers, as the connections between the terminal and the external networks are arranged via the gateway support node of the home network.

In the method and system according to a preferred embodiment of the invention, the operator identifier of the access point is defined on the basis of the subscriber identifier transmitted by the terminal. On the basis of the stored network identifier and the operator identifier, the actual gateway support node address can be defined. This embodiment provides the advantage that from all identification data of the access point, only the network identifier need to be stored in the subscriber data.

It is also possible that the access point name is transmitted by the terminal. According to a preferred embodiment of the invention, the visited network checks whether the network identifier of the access point name transmitted by the terminal is stored. If the network identifier is stored, the visited network transmits a request for packet data protocol context activation to the gateway support node defined by the identifier. This provides the advantage that the selection of the access point can be limited.

BRIEF DESCRIPTION OF THE DRAWINGS

In the following the invention will be described in greater detail in connection with the preferred embodiments, with reference to the attached drawings, in which.

DETAILED DESCRIPTION OF THE INVENTION

The invention can be applied to any packet-switched telecommunication system in which there is no signalling interface between different networks to support subscriber mobility. Such systems may include public mobile communication systems, such as GSM or UMTS (Universal Mobile Telecommunications System), wireless local area networks and particularly various private networks. In the following the invention is applied to a TETRA system without, however, restricting the invention to such a specific system.

Figure 1:
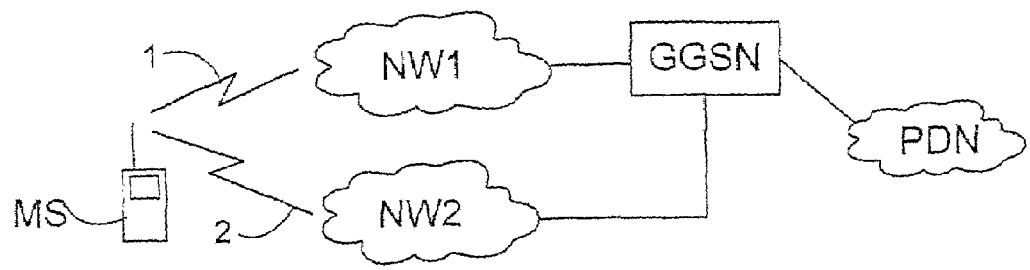
FIG. 1 shows a telecommunication system in general, wherein the GGSN functions as a gateway support node to external packet networks.
Figure 2:
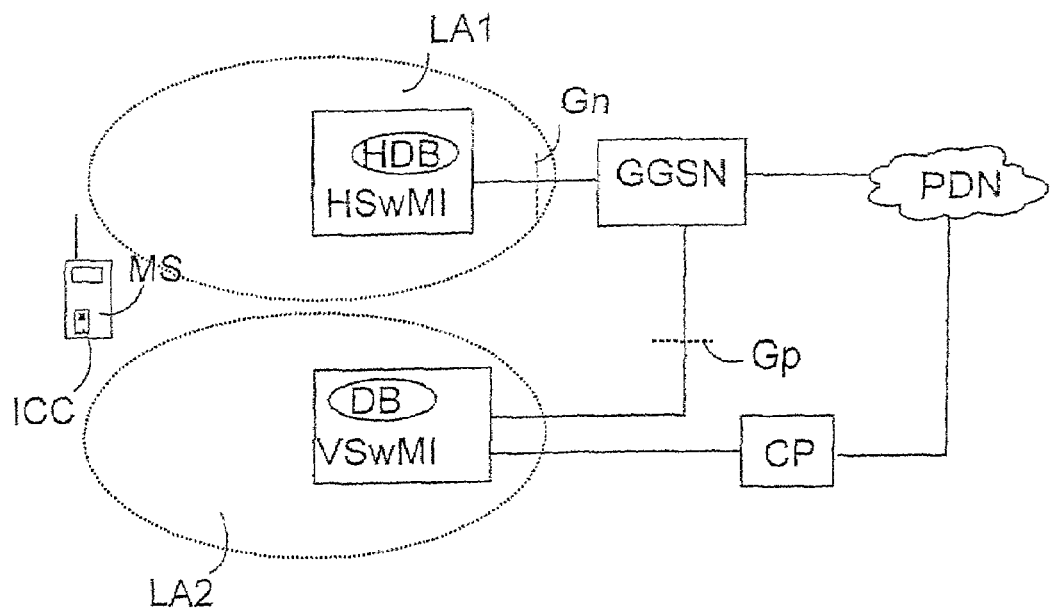
FIG. 2 shows a TETRA packet radio system by way of example, wherein the GGSN functions as a gateway support node to external packet networks.

FIG. 2 only takes the essential parts of the invention into account and shows a TETRA packet radio system wherein a connection to external packet data networks PDN is arranged by using the GPRS gateway support node GGSN. A mobile station MS comprises TETRA network terminal functions (MT, Mobile Terminal) and the actual data terminal (TE, Terminal Equipment), which may also be physically separate parts. A subscriber has made an agreement on the use of packet-switched services with the home network HSwMI operator, from which the subscriber typically obtains a smart card ICC. The ICC comprises a subscriber identifier ITSI (Individual TETRA Subscriber Identity). The function of the smart card ICC comprising the ITSI identifier is, on the one hand, to reliably provide the mobile station and the network with the information on the subscriber and, on the other hand, to transmit the services directed to the subscriber to the correct mobile station. The mobile station MS can thus be regarded to comprise the subscriber identifier ITSI required for the use of TETRA services and to represent the subscriber when the smart card ICC is inserted to the mobile station. Typically, before the smart card can be used, the PIN code (Personal Identification Number) has to be checked. The ITSI identifier consists of two parts <ITSI=MNI+SSI>. The SSI (Short Subscriber Identity) is a personal identifier of the subscriber and is similar to the MSIN (Mobile Subscriber Identity Number) identifier of the GSM/GPRS system. The MNI (Mobile Network Identity) defines the TETRA network and comprises two parts <MNI=MCC+MNC>. The MCC (Mobile Country Code) defines the country identifier of the subscriber. The MNC (Mobile Network Code) is the identifier of the subscriber's home network inside the country, i.e. the identifier of the network HSwMI in the example.

The switching and management infrastructure of the TETRA system, i.e. the TETRA network HSwMI, VSwMI, comprises at least one digital centre, base station functions and radio interface management for establishing a bidirectional data transmission connection over the radio interface to the mobile station MS. A packet-switched data transmission connection can be established between the mobile station MS and the TETRA network HSwMI, VSwMI over the interface R0 defined in the TETRA specifications. A current conception of the TETRA packet data protocol is given in the TETRA specification ETS 300 392-2 clause 19, version ME 04, August 1999.

In order that the services of the TETRA network HSwMI, VSwMI can be utilized, the mobile station MS is registered. The access control for the mobile station MS can then be performed on the basis of the subscriber data and the authentication, and if the mobile station MS is entitled to a packet radio service, a logical link can be formed between the network and the MS and the MS will be available. The home network HSwMI typically comprises a home database HDB in which the subscriber data of the subscriber utilizing the mobile station MS are stored permanently. Mobility management according to the TETRA system can be used between the mobile station MS and the HSwMI (or between the MS and the VSwMI), which means that the TETRA network HSwMI, VSwMI is aware of the location of the subscriber registered in the base station of the network coverage area (LA1, LA2). Since there is no signalling interface between the home network HSwMI and the visited network VSwMI in any case, the prior art roaming is not possible.

The connection between the network HSwMI and the GGSN is arranged via the interface Gn, and the interface between the network VSwMI and the GGSN is correspondingly Gp. The border gateways used by the GGSN and the VSwMI comprise a function of transmitting data over the interface Gp, which is typically an inter-operator backbone network. In this case the network HSwMI (VSwMI) comprises the required function of protocol conversion between the TETRA interface R0 and the GPRS interface Gn (Gp) (relay functionality). Signalling messages according to the TETRA-R0 interface specifications can thus be used between the TETRA network HSwMI, VSwMI and the mobile station MS. At least PDP context activation, deactivation and updating signalling messages according to the GPRS interface Gn, Gp specifications can be used between the TETRA network HSwMI, VSwMI and the gateway support node GGSN. The connection between the network HSwMI, VSwMI and the GGSN is preferably arranged on the basis of the IP protocol.

An access point to the external networks PDN is selected on the basis of an access point name APN. The APN refers to the gateway support node GGSN and comprises two parts: a network identifier and an operator identifier. The operator identifier defines the network where the GGSN is. The network identifier defines the GGSN address in the network. The APN can be a DNS name (Domain Name System) which can be converted to an individual IP address. Inside one IP subnetwork only the network identifier is needed. Thus the physical address of the gateway support node GGSN is obtained from the access point name APN.

The GGSN transmits packets between the mobile station MS and the external packet networks PDN on the basis on the activated packet data protocol context. If a registered mobile station MS desires to activate a packet data protocol context for data transmission, the mobile station transmits the network HSwMI a request for PDP context activation. The PDP context based on the TETRA packet data protocol and the GTP tunnelling protocol is activated for the mobile station MS. As a result of the PDP context activation (in the mobile station MS, the network HSwMI, VSwMI and the gateway support node GGSN), a PDP address is allocated to the mobile station MS and a GTP tunnel is formed between the GGSN and the HSwMI. Thereafter the MS can transmit/receive packets on the basis of the activated context.

External packet networks PDN can be networks that are based on the IP protocol, e.g. the Internet or private intranet networks. The HSwMI may comprise several Gn gateways (cf. the SGSN in the GPRS system) that are responsible for a group of base stations. When a mobile station moves from the Gn gateway to a new gateway, the new gateway requests the previous gateway for the PDP context information and transmits the information on the new address to the gateway support node GGSN.

When the mobile station MS moves to the coverage area LA2 of another TETRA network VSwMI, the packet radio services of the mobile station MS have to be provided through the network VSwMI. Since the network identifier MNC and/or the country identifier MCC of the VSwMI are different than those of the HSwMI, roaming, or 'migration' as it is defined in the TETRA specifications, takes place. In accordance with the invention, the connection to the external networks PDN is further activated through the gateway support node GGSN of the home network HSwMI, instead of utilizing a connection point CP, for instance, which can also be a gateway support node comprising the GGSN functionality. The role of the GGSN can thus be maintained also during roaming. If the mobile station MS moves to the network VSwMI from which there is no signalling connection to the home network HSwMI, the VSwMI does not obtain information on the gateway support node GGSN in accordance with the prior art, nor can the PDP context be established.

In the system according to the invention, the visited network VSwMI defines the gateway support node address on the basis of the subscriber identifier transmitted by the mobile station MS and the access point information stored in the network VSwMI.

Since there is no signalling interface between the VSwMI and the HSwMI, the subscriber data cannot be requested from the home network HSwMI. This is why the VSwMI comprises a database DB comprising data on subscribers who are entitled to use the VSwMI services. These data comprise at least the required subscriber identifiers and preferably also the information that is necessary for the authentication and the data transmission encryption. To identify the subscriber, at least the SSI identifier is stored, entirely or partly subscriber-specifically, in the DB. Thus the VSwMI can check the ITSI identifier transmitted by the mobile station MS and provide services if the mobile station MS is entitled to roam.

In order to detect the gateway support node GGSN, the DB also comprises at least the access point network identifier corresponding to the GPRS specifications. The network identifier is preferably defined subscriber-specifically on the basis of the SSI identifier or the ITSI identifier, which means that the access point network identifier to be used is determined in every subscriber's data. The network identifier may be in accordance with the domain name of the operator, e.g. "xxx.company.com", but it does not end with the identifier ".gprs". The subscriber data of the DB can be maintained on the basis of roaming agreements, which means that the home network HSwMI delivers data on subscribers being entitled to roam the network VSwMI once a month, for example. The VSwMI stores the information it receives in the database DB. It is also possible that the identification data of the access points are stored in the database DB operator- or network-specifically, i.e. a certain access point is defined for all home network HSwMI subscribers. The identification data can also be stored group-specifically, for instance company-specifically.

Figure 3A:
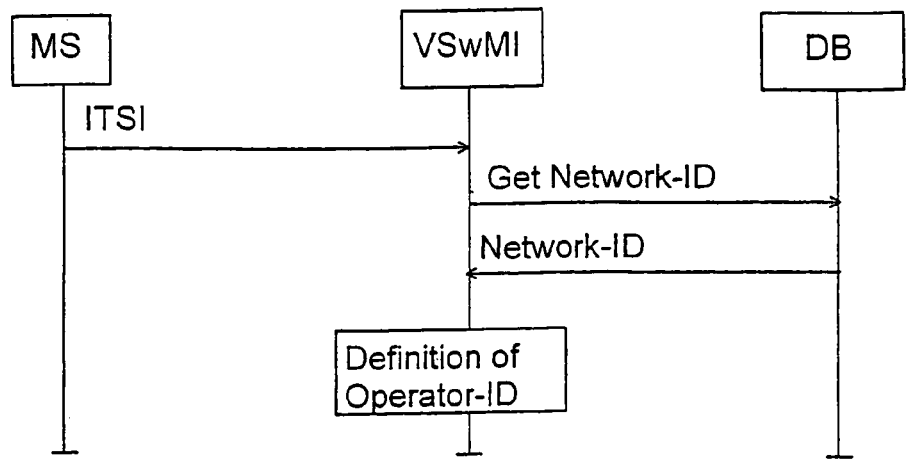
FIG. 3a is a signalling diagram illustrating how an access point name is defined according to a first embodiment of the invention.

In the following, it is explained by means of FIG. 3a how an access point name APN of the system according to a first preferred embodiment of the invention is defined.

During the registration [ITSI] the ITSI identifier is obtained from the mobile station MS. When the MS requests for PDP context activation, the VSwMI retrieves the access point network identifier from the database DB on the basis of the SSI identifier or the ITSI identifier [Get Network ID], [Network-ID]. Since the gateway support node (GGSN) is in another network, the network VSwMI has to define the operator identifier [Definition of Operator-ID]. The VSwMI defines the operator identifier from the ITSI subscriber identifier. The APN operator identifier typically comprises three parts, the first two parts identifying the GPRS PLMN network and the last part being ".gprs", which indicates that it deals with a GPRS system. The first two parts of the operator identifier have preferably been derived from the country identifier MCC of the ITSI identifier, and the identifier MNC. As a domain name, the operator identifier can thus have the form yyyyMCC.zzzzMNC.gprs, wherein yyyy and zzzz are, if required, additional identifiers of varying length. If the ITSI of the mobile station MS subscriber is "123 45 6789", the VSwMI separates "yyyy45.zzzz123.gprs" from the ITSI identifier as an operator identifier.

As the VSwMI has defined the operator identifier, the operator identifier and the network identifier form the actual APN, and the gateway support node GGSN can be contacted. It is to be noted that the APN can also be defined in another order than what is illustrated in FIG. 3a, i.e. the VSwMI can define the operator identifier before retrieving the network identifier.

Figure 3B:
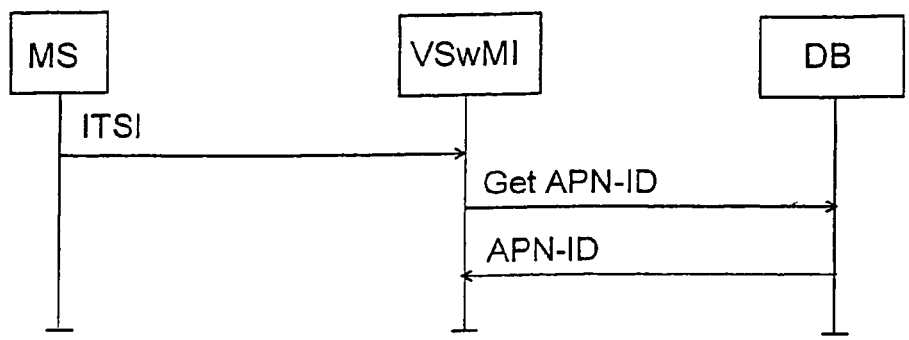
FIG. 3b is a signalling diagram illustrating how an access point name is defined according to a second embodiment of the invention.

In the following it is explained by means of FIG. 3b how a GGSN access point name APN of the system according to a second embodiment of the invention is defined. The idea is that the access point names APN have been stored in their entirety in the database DB preferably subscriber-specifically. On the basis of the ITSI identifier [ITSI] obtained from the mobile station MS, the VSwMI can retrieve the APN [Get APN-ID], [APN-ID] from the database DB. The APN comprises both the network identifier and the operator identifier, wherefore the connection can be established to the gateway support node GGSN.

The access point name APN defined in the above embodiments of the invention is typically a logical DNS name, which can be converted to an IP address by a DNS server. The actual address of the gateway support node GGSN is obtained this way. The gateway support node address definition according to the first embodiment provides the advantage that it is not necessary to store so much subscriber data in the visited networks as in the second embodiment and that the APN information that is to be stored for the visiting subscribers can be stored in the same form as the APN information of the network's VSwMI own subscribers. Although the VSwMI and the DB in FIGS. 3a and 3b are illustrated as separate parts for the sake of clarity, the DB preferably forms a part of the visited network VSwMI. As the DB is a part of the network VSwMI, the network element controlling the PDP context management can retrieve the information logically from the database DB. The DB can be in the memory space of the TETRA centre, for instance.

The TETRA system does not support the use of the APN transmitted by the mobile station, wherefore the network VSwMI has to define the gateway support node GGSN address on the basis of the subscriber data and the subscriber identifier.

Figure 4:
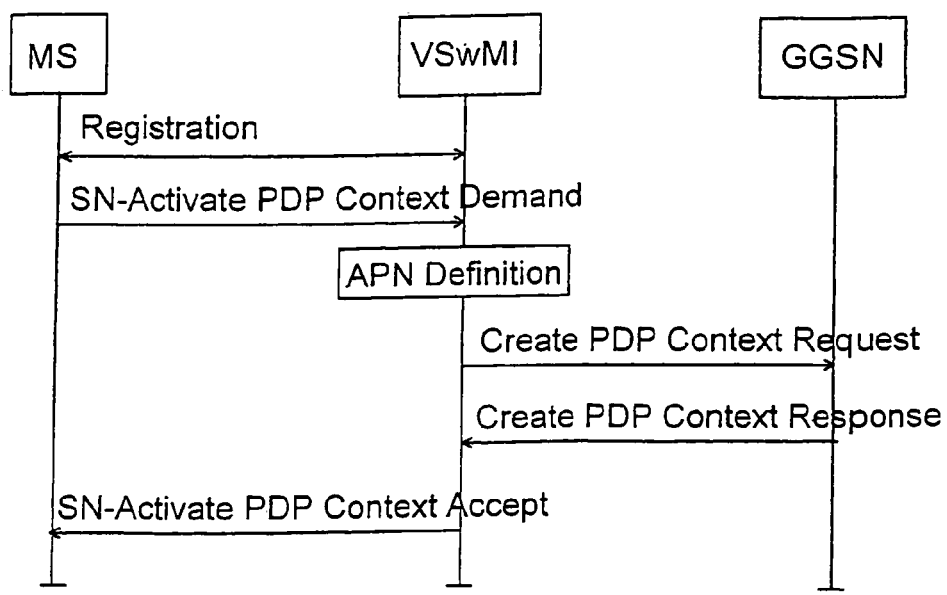
FIG. 4 shows by way of example and by means of a signalling diagram how a mobile station and a packet data protocol context are activated.

In the following it is explained by means of the signalling diagram of FIG. 4 how the mobile station MS registers in the visited network VSwMI and how a packet data protocol context is activated in the gateway support node GGSN. When the mobile station MS visits a base station of the coverage area LA2, the MS registers in the network VSwMI [Registration]. The registration can take place when the user switches on the mobile station in the area LA2 or when the active MS moves to the area LA2. The ITSI identifier identifying the subscriber is transmitted from the mobile station MS. When the VSwMI detects that it is a roaming MS, it preferably checks the subscriber data from the database DB. If the subscriber is entitled to roam (the subscriber data are to be found in the DB), the VSwMI allows the services to be provided.

When a packet data protocol context is established from the registered mobile station MS for data transmission, the MS transmits the network VSwMI a request for PDP context activation [SN-Activate PDP Context Demand]. The mobile station MS can indicate whether it wants to use a fixed or a dynamic PDP address. At this stage safety functions, such as authentication, can be performed between the mobile station MS and the network VSwMI. If the mobile station MS is allowed to activate the PDP address, the VSwMI can create a TETRA PDP context for the mobile station MS. The PDP context maps the GTP tunnel to be formed and the R0 interface functions to the TETRA mobility management. For this purpose, the VSwMI creates a TID (Tunnel Identifier, which is used in the GPRS tunnelling protocol between the network elements for identifying the PDP context) for the requested PDP context on the basis of the ITSI identifier and a NSAPI (Network layer Service Access Point Identifier) received from the mobile station MS. If the MS has requested for a fixed IP address, the subscriber data preferably include the PDP address which is to be used and which is defined by the home network HSwMI. If the MS has requested for a dynamic IP address, the VSwMI allows the gateway support node GGSN to allocate the address.

In accordance with the previous description, the VSwMI may define the access point name APN [APN Definition]. On the basis of the IP address according to the APN, a request for PDP context activation [Create PDP Context Request] is transmitted over the interface Gp to the gateway support node GGSN. The VSwMI transmits the APN in the request for PDP context activation [Create PDP Context Request] in the APN field according to the GTP specification 09.60. The VSwMI stores the IP address (which can be converted from a logical name) of the gateway support node GGSN in connection with the requested PDP context (GGSN Address in Use) and uses the address as long as the PDP context exists.

If the gateway support node GGSN can accept the PDP context activation request, the PDP context activation can be finished. The GGSN adds the new context to a PDP context table and forms a charging identifier. The GGSN also transmits the network VSwMI a message concerning the PDP context activation, which message may comprise a dynamic PDP address [Create PDP Context Response]. In response to this, the VSwMI maps the NSAPI identifier to the GGSN address. The VSwMI further transmits the mobile station MS the information on the PDP context activation [SN-Activate PDP Context Accept].

When the PDP context is activated, the mobile station MS can transmit data packets to be transferred via the established context to the network VSwMI and further to the gateway support node GGSN, and vice versa. The GGSN communicates with other packet networks PDN as is defined in the GPRS specifications. If the GGSN receives data packets that are designated for the mobile station MS from the external networks PDN, the GGSN transmits the data packets in accordance with the active PDP context to the network VSwMI which transmits them further to the mobile station MS.

If the mobile station MS has had an active PDP context to the gateway support node GGSN via the network HSwMI before moving to the network VSwMI, the PDP context activated in the HSwMI can be deleted when the mobile station moves to the network VSwMI. The HSwMI can transmit a request for PDP context deactivation (Delete PDP Context Request) to the gateway support node GGSN, when the HSwMI detects that the MS is no longer available. The GGSN deletes the PDP context according to the TID identifier and releases the PDP address to be used by other mobile stations. The GGSN also transmits the HSwMI a message that the PDP context has been deleted.

If the visited network VSwMI supports the use of the APN which is transmitted from a roaming mobile station MS, the visited network VSwMI can check in accordance with one embodiment of the invention on the basis of the subscriber identifier whether the network identifier transmitted by the mobile station MS is stored in the subscriber data. If the network identifier is stored, the PDP context activation request can be transmitted to the gateway support node GGSN according to the APN. If the network identifier is not stored, the network VSwMI can preferably either deny the PDP context establishment or transmit an activation request to the gateway support node that is allowed by the subscriber data. Thus, also the access point selection of a visiting subscriber can be controlled.

It is to be noted that the invention can also be applied to situations where a mobile station moves from a first visited network to a second visited network. A requirement for this is that at least the access point network identifier of the home network is defined in the second visited network, in which case the second visited network can define the gateway support node address on the basis of the network identifier and the subscriber identifier.

The invention can also be applied to a telecommunication system which consists of networks utilizing a different technique, i.e. different standards. As long as the communication to the gateway support node takes place according to the same interface specifications, the operation between the mobile station and the network can be arranged differently in a home network and a visited network. If the mobile station supports different networks, the packet data protocol context between the gateway support node and the mobile station can be activated on the basis of the subscriber data and the network identifier stored in the network. A home network, for instance, can be a network that is in accordance with the TETRA standard and utilizes the gateway support node GGSN and a visited network can be a UMTS network.

It is obvious to a person skilled in the art that as technology advances, the basic idea of the invention can be implemented in a variety of ways. The invention and its embodiments are thus not restricted to the above examples but may be modified within the scope of the claims.

The invention claimed is:

1. A method of activating a packet data protocol context for a roaming terminal in a telecommunication system comprising a home network, a gateway support node connected to an external packet network, said node being used in the home network, at least one roaming terminal and a visited network, in which system there is no signalling interface between the home network and the visited network to support mobility management, the method comprising:
    storing at least a network identifier of an access point served by said gateway support node in the visited network for the at least one roaming terminal,
    defining an address of said gateway support node in the visited network based on said network identifier and a subscriber identifier transmitted by the at least one roaming terminal, in response to the at least one roaming terminal requesting packet data protocol context activation,
    transmitting a request for packet data protocol context activation from the visited network to said gateway support node based on said gateway support node address, and
    finishing the activation of the packet data protocol context between the at least one roaming terminal and said gateway support node.

2. A method as claimed in claim 1, wherein
    said gateway support node is GGSN and said gateway support node address is defined based on an access point name APN.

3. A method as claimed in claim 1, wherein the gateway support node address obtained based on the network identifier and the subscriber identifier transmitted by the at least one roaming terminal is a domain name, and
    converting the domain name to an IP address of said gateway support node.

4. A method as claimed in claim 1, wherein
    at least said network identifier is stored subscriber-specifically or group-specifically.

5. A method as claimed in claim 1, wherein an access point operator identifier is defined based on the subscriber identifier, and
    said gateway support node address is defined based on the stored network identifier and the operator identifier.

6. A method as claimed in claim 1, wherein an access point operator identifier is also stored in the visited network for roaming terminals, and
    said gateway support node address is defined based on the stored operator identifier and network identifier.

7. A method as claimed in claim 1, wherein
    information on a desired access point served by the gateway support node is transmitted from the terminal in connection with the request for packet data protocol context activation,
    checking whether a network identifier included in said information transmitted by the terminal is stored in the visited network, and
    the request to said desired gateway support node is transmitted in order to activate the packet data protocol context, in response to the network identifier of said desired access point being stored in the visited network.

8. A method as claimed in claim 1, wherein the home network and the visited network are TETRA networks and said subscriber identifier is an ITSI identifier.

9. A packet-switched telecommunication system comprising
    a home network and at least one visited network, there being no signalling interface therebetween to support mobility management,
    in the home network, a gateway support node connected to an external packet network, said node being used for at least one terminal, wherein the at least one visited network is configured to define an address of said gateway support node based on a pre-stored network identifier of an access point served by said gateway support node and a subscriber identifier transmitted by a roaming terminal, in response to the roaming terminal requesting packet data protocol context activation, and the visited network is configured to transmit the request for packet data protocol context activation to said gateway support node based on said gateway support node address.

10. A telecommunication system as claimed in claim 9, wherein said gateway support node is a General Packet Radio Service GPRS gateway support node GGSN and said gateway support node address is defined based on an APN.

11. A telecommunication system as claimed in claim 9, wherein the visited network is configured to define an access point operator identifier based on the subscriber identifier transmitted by a terminal, and the visited network is configured to define the address of said gateway support node based on the network identifier and the operator identifier.

12. A telecommunication system as claimed in claim 9, wherein the visited network is configured to define the address of said gateway support node based on a pre-stored operator identifier and said network identifier.

13. A telecommunication system as claimed in claim 9, wherein the visited network is configured to check whether a network identifier of a desired access point served by the gateway support node and transmitted by a terminal is stored in the visited network, and the visited network is configured to transmit the request to said desired gateway support node to activate the packet data protocol context, in response to a network identifier of said desired access point being stored in the visited network.

14. A network equipment for a telecommunication system comprising a home network, a gateway support node connected to an external packet network, said node being used in the home network, at least one roaming terminal and a visited network, in which system there is no signalling interface between the home network and the visited network to support mobility management, wherein the network equipment is configured to store a network identifier of an access point served by said gateway support node for the at least one roaming terminal, the network equipment is configured to define an address of said gateway support node based on said network identifier and a subscriber identifier transmitted by the at least one roaming terminal, in response to the at least one roaming terminal requesting for packet data protocol context activation, and the network equipment is configured to transmit a request for packet data protocol context activation to said gateway support node based on the gateway support node address.

15. A telecommunication system as claimed in claim 9, wherein the home network and the visited network are TETRA networks and the subscriber identifier is an Individual TETRA Subscriber Identity ITSI.

16. The network equipment as claimed in claim 14, wherein the home network and the visited network are TETRA networks and the subscriber identifier is an Individual TETRA Subscriber Identity ITSI.

* * * * *